US012567246B2

(12) United States Patent
Hua et al.

(10) Patent No.: US 12,567,246 B2
(45) Date of Patent: Mar. 3, 2026

(54) FAIR NEURAL NETWORKS

(71) Applicants:Ford Global Technologies, LLC, Dearborn, MI (US); The Board of Trustees of the Leland Stanford Junior University, Stanford, CA (US)

(72) Inventors: Xinru Hua, Redwood City, CA (US); Huanzhong Xu, Stanford, CA (US); Jose Blanchet, Palo Alto, CA (US); Viet Anh Nguyen, Hanoi (VN); Marcos Paul Gerardo Castro, San Francisco, CA (US)

(73) Assignees: Ford Global Technologies, LLC, Dearborn, MI (US); The Board of Trustees of the Leland Stanford Junior University, Stanford, CA (US)

( * ) Notice: Subject to any disclaimer, the term of this patent is extended or adjusted under 35 U.S.C. 154(b) by 631 days.

(21) Appl. No.: 18/051,578

(22) Filed: Nov. 1, 2022

(65) Prior Publication Data

US 2024/0144663 A1 May 2, 2024

(51) Int. Cl.
*G06V 10/82* (2022.01)
*G06T 7/70* (2017.01)
*G06V 10/74* (2022.01)

(52) U.S. Cl.
CPC .............. *G06V 10/82* (2022.01); *G06T 7/70* (2017.01); *G06V 10/761* (2022.01); *G06T 2207/20081* (2013.01)

(58) Field of Classification Search
CPC ........ G06V 10/82; G06V 10/761; G06T 7/70; G06T 2207/20081
See application file for complete search history.

(56) References Cited

U.S. PATENT DOCUMENTS

2020/0051239 A1 2/2020 Braun et al.
2021/0357745 A1 11/2021 Wallis et al.

FOREIGN PATENT DOCUMENTS

CN 112085194 A 12/2020

OTHER PUBLICATIONS

Chen Y, Xu K, He D, Ban X. Generating robust real-time object detector with uncertainty via virtual adversarial training. International Journal of Machine Learning and Cybernetics. Feb. 2022;13(2):431-45. (Year: 2022).*
Chen, Ruidi, Boran Hao, and Ioannis Paschalidis. "Distributionally robust multiclass classification and applications in deep cnn image classifiers." stat 1050 (2021): 27. (Year: 2021).*

(Continued)

*Primary Examiner* — Tracy Mangialaschi
(74) *Attorney, Agent, or Firm* — Frank A. MacKenzie; Brooks Kushman P.C.

(57) ABSTRACT

A system is disclosed that includes a computer that includes a processor and a memory, the memory including instructions executable by the processor to input an image acquired by a sensor to a neural network to output a prediction regarding an object included in the image. The neural network can be trained based on (a) a distributed robust optimization that minimizes an expectation applied to probability distributions of loss functions to select training images that yield a solution with a selected uncertainty level and (b) generating additional input images based on adversarial images.

20 Claims, 6 Drawing Sheets

(56)     References Cited

OTHER PUBLICATIONS

Miyato, Takeru, et al. "Virtual adversarial training: a regularization method for supervised and semi-supervised learning." IEEE transactions on pattern analysis and machine intelligence 41.8 (2019): 1979-1993. (Year: 2019).*
Liu Y, Jiang M, Jiang T. Transferable adversarial examples based on global smooth perturbations. Computers & Security. Oct. 1, 2022;121:102816. (Year: 2022).*
Ren., A. et al., Distributionally Robust Policy Learning via Adversarial Environment Generation, swingarXiv:2107.06353v4 [cs.RO], Dec. 28, 2021, 11 pages.

* cited by examiner

100

FAIR NEURAL NETWORKS

BACKGROUND

Images can be acquired by sensors and processed using a computer to determine data regarding an environment around a system. For example, a computer can acquire images from one or more image sensors that can be processed to determine data regarding objects. Data extracted from images of objects can be used by a computer to operate systems including vehicles, robots, security systems, and/or object tracking systems.

DETAILED DESCRIPTION

Figure 1:
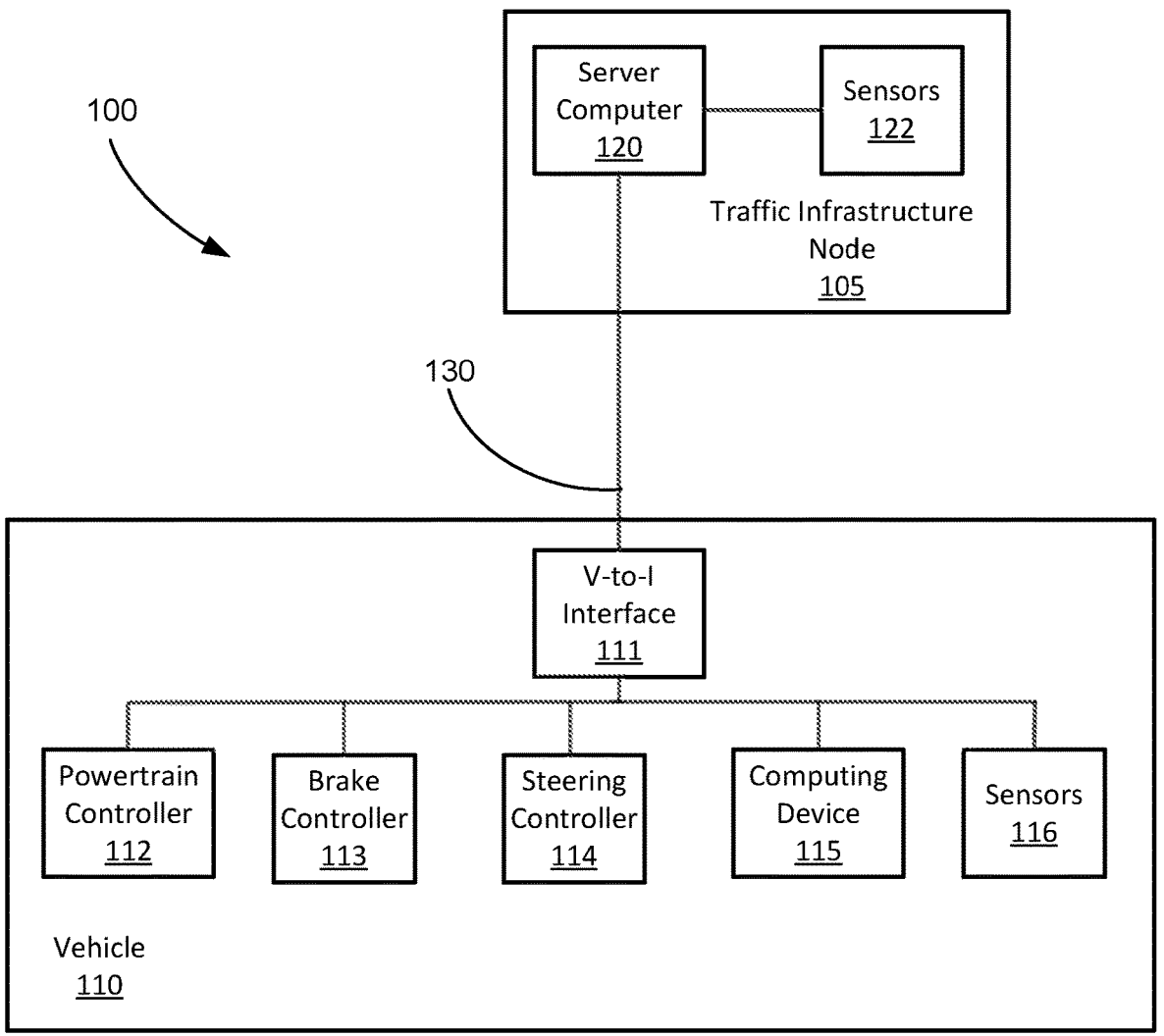
FIG. 1 is a block diagram of an example traffic infrastructure system.

A neural network can be trained to determine data regarding an environment around a system. For example, a system as described herein can be used to locate objects in an environment around the system and operate the system based on the location of the objects. In some examples, sensor data can be provided to a computer to determine an object identity and an object location and determine a system trajectory based on the identity and location of the object. A trajectory is a set of locations that can be indicated as coordinates in a coordinate system that along with velocities, e.g., vectors indicating speeds and headings, at respective locations. A computer in a system can determine a trajectory for operating the system that locates the system or portions of the system with respect to the object. A vehicle is described herein as an example including a system that includes a sensor to acquire data regarding an object, a computer to process the sensor data and controllers to operate the vehicle based on output from the computer. Other systems that can include sensors, computers and controllers that can respond to objects in an environment around the system include robots, security systems and object tracking systems.

Image sensors used to acquire image data regarding an environment around a system. The image data can be input to a neural network included in a computer to determine predictions regarding the environment. For example, an image sensor can acquire image data and input the image data to a neural network. The neural network can input the image data and determine an identity and location of an object included in the image. In examples where the image sensor and the neural network is included in a vehicle, a computer in the vehicle can determine a vehicle trajectory based on the identity and location of the object. In examples where the image sensor and the neural network is included in a robot, a computer in the robot can determine a trajectory for a gripper to cause the gripper to move to a position where it can grasp the object. In examples where the image sensor and neural network is included in a security system, a computer in the security system can unlock a door based on identifying a person in the image. In examples where the image sensor and neural network is included in an object tracking system, a computer can route a package in a package sorting facility. Vehicles operating using neural networks to detect objects in an environment around the vehicle will be used as non-limiting examples herein, however, techniques discussed herein to enhance fairness in training neural networks will apply generally to any neural network image processing task.

Trained neural networks may perform well in numerous tasks involving object classification and image generation. However, small perturbations that may not affect or be perceived by a human observer may significantly degrade the performance of well-trained deep neural networks. Techniques described herein enhance neural network training by using adversarial dataset generation to generate image data that can cause a neural network to fail while appearing similar to images that are successfully processed by the neural network. Adversarial dataset generation can generate images that are imperceptibly different from input images. Imperceptibly different images can differ in size, location, orientation, brightness, contrast, or texture while a human observer typically would not detect a difference between the images based on visual inspection. Imperceptible differences can be measured using two image differences measures: 1-SSIM and PieApp. 1-SSIM and PieApp will be discussed in relation to FIG. 3, below. Training a neural network using imperceptibly different images as measured by 1-SSIM and/or PieAPP can enhance neural network training by adding images to the training dataset that would not be included in a training dataset compiled based on human observation.

Neural network training also limited because the quality of the training depends upon how well the training dataset compares to the data to be encountered when the trained neural network is released into the world for use. Techniques described herein use distributionally robust optimization (DRO) which is a technique for selecting a distribution of images from a training dataset that mirrors and unknown distribution of images to be encountered in the real world. A robust neural network experiences an error rate on test datasets that is similar to the error rate encountered during training. Training neural networks with DRO and optimally designed imperceptibly different test images can enhance the performance of neural networks by increasing fairness. Fairness in the context of a neural network trained to recognize objects in mages means that the neural network achieves a same error rate on a range of images encountered in the real world as an error rate generated by the training dataset. Augmenting a training dataset using adversarial dataset generation and DRO can enhance fairness by training a neural network using a training dataset that models image data to be encountered in the real world.

A method is disclosed herein, including inputting an image acquired by a sensor to a neural network to output a prediction regarding an object included in the image and wherein the neural network is trained, based on (a) a distributed robust optimization that minimizes an expectation applied to probability distributions of loss functions to select training images that yield a solution with a selected uncertainty level and (b) generating additional input images based on adversarial images. Outputting the prediction regarding the image can include outputting an object identity and an object location. The neural network can output a confidence value that indicates a probability that the prediction regarding the image is correct. The loss function can be determined based on comparing output from the neural network with ground truth data based on the input image. The neural network can include convolutional layers and fully connected layers. The input images can be respectively input to the neural network a plurality of times and the loss functions are backpropagated through layers of the neural network to select weights that minimize the loss functions. Generating the additional input images based on the adversarial images can include determining imperceptible differences based on a structural similarity index measure.

The structural similarity index measure can generate images that are not perceptibly different to a human observer but can cause the neural network to fail. Generating the additional input images based on the adversarial images can include determining imperceptible differences based on processing the input image with a PieAPP neural network. The PieAPP neural network can generate images that are not perceptibly different to a human observer but can cause the neural network to fail. The structural similarity index measure can be based on determining a ratio of joint pixel means times joint standard deviations to summed pixel means times summed pixel standard deviations. The PieApp neural network can determine image similarity by determining pairwise preference. The structural similarity index measure and/or the PieApp neural network can generate an adversarial dataset for training the neural network. Training the neural network based on an adversarial network can achieve fairness.

Further disclosed is a computer readable medium, storing program instructions for executing some or all of the above method steps. Further disclosed is a computer programmed for executing some or all of the above method steps, including a computer apparatus, programmed to input an image acquired by a sensor to a neural network to output a prediction regarding an object included in the image and wherein the neural network is trained, based on (a) a distributed robust optimization that minimizes an expectation applied to probability distributions of loss functions to select training images that yield a solution with a selected uncertainty level and (b) generating additional input images based on adversarial images. Outputting the prediction regarding the image can include outputting an object identity and an object location. The neural network can output a confidence value that indicates a probability that the prediction regarding the image is correct. The loss function can be determined based on comparing output from the neural network with ground truth data based on the input image. The neural network can include convolutional layers and fully connected layers. The input images can be respectively input to the neural network a plurality of times and the loss functions are backpropagated through layers of the neural network to select weights that minimize the loss functions. Generating the additional input images based on the adversarial images can include determining imperceptible differences based on a structural similarity index measure.

The instructions can include further instructions where the structural similarity index measure can generate images that are not perceptibly different to a human observer but can cause the neural network to fail. Generating the additional input images based on the adversarial images can include determining imperceptible differences based on processing the input image with a PieAPP neural network. The PieAPP neural network can generate images that are not perceptibly different to a human observer but can cause the neural network to fail. The structural similarity index measure can be based on determining a ratio of joint pixel means times joint standard deviations to summed pixel means times summed pixel standard deviations. The PieApp neural network can determine image similarity by determining pairwise preference. The structural similarity index measure and/or the PieApp neural network can generate an adversarial dataset for training the neural network. Training the neural network based on an adversarial network can achieve fairness.

FIG. 1 is a diagram of a sensing system 100 that can include a traffic infrastructure node 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in autonomous, semi-autonomous, or manual modes. By a semi- or fully-autonomous mode, we mean a mode of operation wherein a vehicle can be piloted partly or entirely by a computing device as part of a system having sensors and controllers. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. In a semi-autonomous mode, some but not all of them are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120, can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary.

That is, each sensor 122 is mounted to the infrastructure node so as to have a substantially unmoving and unchanging field of view.

Server computer 120 typically has features in common, i.e., a computer processor and memory and configuration for communication via a network 130, with the vehicle 110 V2X interface 111 and computing device 115, and therefore these features will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure or thing that can be detected by a vehicle sensor 116 and/or infrastructure sensor 122.

Figure 2:
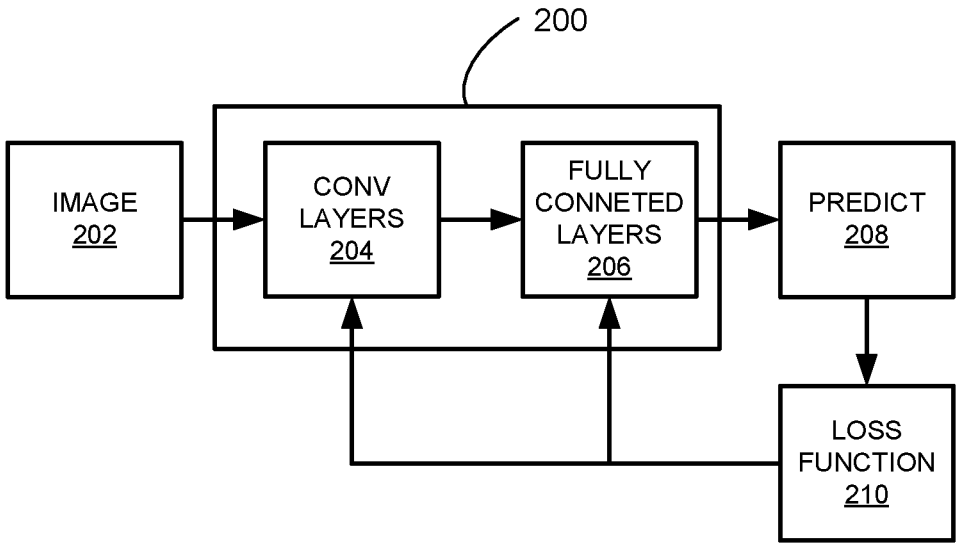
FIG. 2 is a diagram of an example neural network.

FIG. 2 is a diagram of a system for training a convolutional neural network (CNN) 200. CNN 200 includes convolutional layers 204 (CONV LAYERS) and fully connected layers 206 (FULLY CONNECTED LAYERS). Convolutional layers 204 can receive as input images 202 (IMAGE) and convolve the images with a plurality of small (5×5, 7×7, etc.) kernels to extract features from the image 202. The convolutional layers 204 can include pooling functions between the layers to reduce the size of the image data and localize the extracted features. The values that convolutional kernels use to process the image data are determined by programmable weights. Convolutional layers 204 output latent variables indicating locations of detected features to fully connected layers 206. Fully connected layers 206 include neurons that calculate linear and non-linear functions of the input latent variables to determine predictions 208 (PREDICT) based on the input images 202. For example, a CNN 200 can be trained to output predictions 208 regarding labels indicated by objects included in input images 202, e.g., vehicles or pedestrians. The calculations performed by the fully connected layers 206 are determined by programmable weights.

At training time, a training dataset that includes a plurality of images 202 and ground truth data indicating the correct predictions the neural network should extract from the input images 202. The ground truth data is determined by techniques that do not include employing the CNN 200, for example, human observation and measurement of the image data. A CNN 200 can be trained by inputting an image 202 from the training dataset to the CNN 200 a plurality of times. Each time the image 202 is processed to form a prediction, a loss function 210 (LOSS FUNCTION) is determined. A loss function is an equation that compares the prediction to the ground truth to determine how well the CNN 200 has processed the image 202. The loss function can be back-propagated through the layers of CNN 200. Backpropagation is a technique for inputting the loss function 210 to the layers of the CNN 200 starting with the output and proceeding through the layers of the CNN 200 to the input. The weights can be modified based on the loss function and the image 202 re-processed by the CNN 200 and a new loss function 210 determined. By processing the input image 202 a plurality of times, weights for the convolutional layers 204 and fully connected layers 206 can be determined that minimize the loss function. The CNN 200 can be trained by determining the weights that minimize the loss function 210 for all of the images 202 in the training dataset. A CNN 200 can also be trained to output a confidence value along with a prediction. A confidence value is a probability that the accompanying prediction is correct.

Figure 3:
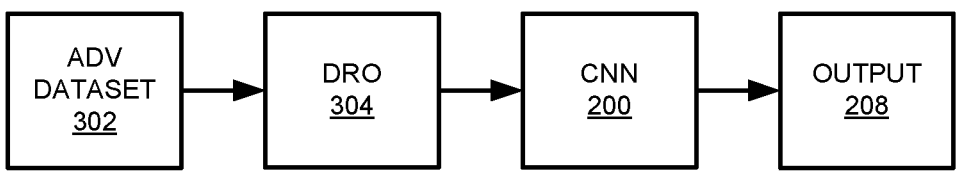
FIG. 3 is a diagram of an example neural network configured to enhance fairness.

FIG. 3 is a diagram illustrating training a CNN 200 with adversarial dataset generation (ADV DATASET) 302 and distributionally robust optimization (DRO) 304. Adversarial dataset generation 302 is a technique for generating images that can cause a trained CNN 200 to fail by introducing changes in images that can be imperceptible to a human observer but measurable using 1-SSIM or PieAPP. For example, small changes in image location, scale, rotation, brightness, contrast and texture can cause an image to be unsuccessfully processed that, when unaltered, yields a prediction that successfully matches ground truth data. 1-SSIM or PieAPP can be used to quantify what changes in images will result in failure of a CNN 200 to properly process an image. A prediction output from a CNN 200 in response to an altered image unsuccessfully matches the ground truth data when the prediction fails to matches the ground truth. For example, an unsuccessful match would be failure to identify a vehicle or pedestrian in an input image. Unsuccessfully matching can alternatively or additionally mean that the CNN 200 outputs a low confidence value to accompany the prediction.

Generating adversarial images from an existing image included in a training dataset includes modifying the existing image using suitable image processing techniques. An existing image can be modified by performing geometric transformations on the pixels of the existing image to change the location, scale, and orientation of objects included in the image, for example. An existing image can be modified by performing multiplicative and additive changes to the pixels to change brightness and contrast of the existing image. An existing image can alternatively or additionally be modified by adding random noise to the pixels of the image to change the texture. Operations for modifying (i.e., making a change to) an image such as the foregoing examples typically include specifying size, location, orientation, brightness, contrast or texture parameters that can be adjusted to determine the amount of change to introduce to the image to generate an adversarial image. Techniques described herein generate a series of adversarial images by increasing an amount of change by increasing the values of the parameters while measuring the computational effort introduced at each step. Computational effort is a measure of computational resources required to produce an image difference as determined by 1-SSIM and/or PieAPP and can be used to determine whether a change introduced to an image would be imperceptible to a human observer.

Techniques can be used to measure computational effort in images determine an adversarial dataset generation 302. These techniques measure image differences to determine that the differences introduced into an image are imperceptible to a human observer. Including images in a training dataset that include differences imperceptible to a human observer is useful because a human will not typically include images that include imperceptible differences in a training database. Images that include imperceptible differences can cause a CNN 200 to fail and including images that include imperceptible differences in a training dataset will result in a more robust trained CNN 200 that can successfully process a wider variety of input images.

One technique for determining imperceptible differences is a structural similarity index measure (1-SSIM). 1-SSIM is a reward function that determines the structural similarity of two images. Structural similarity is when two images have similar but not exactly the same structures or objects in similar but not exactly the same location, size, orientation, contrast, brightness or texture. 1-SSIM for two images x and y can be determined by the equation:

$$1 - SSIM(x, y) = \frac{(2\mu_x\mu_y + C_1)(2\sigma_{xy} + C_2)}{(\mu_x^2 + \mu_y^2 + C_1)(\sigma_x^2 + \sigma_y^2 + C_2)} \qquad (1)$$

Where $\mu_x$ and $\mu_y$ are the mean intensities of the pixel values in images x and y, $\sigma_x$ and $\sigma_y$ are the standard deviations of the pixel values in images x and y and $\sigma_{xy}$ is determined by the equation:

$$\sigma_{xy} = \frac{1}{N-1}\sum_{i=1}^{N}(x_i - \mu_x)(y_i - \mu_y) \qquad (2)$$

Where $x_i$ and $y_i$ are the pixel values in images x and y having N pixels each. 1-SSIM is a computational effort function that expresses a difference between two images as computational effort, e.g., the greater the difference between images, the greater computational effort associated with the difference. Image differences that are imperceptible to humans have low computational effort 1-SSIM values. 1-SSIM values that can indicate image differences that are imperceptible to humans can be determined empirically by testing images from a training dataset to determine 1-SSIM values that indicate imperceptible differences.

An alternative or additional measure of image similarity can be determined by a PieAPP neural network. A PieAPP neural network can determine the probability that a human observer would think that a first image is of more similar to a reference image than a second image. A PieAPP neural network is described in "PieAPP: Perceptual image-error assessment through pairwise preference" by Ekta Prashnani, Hong Cai, Yasamin Mostofi, and Pradeep Sen, Proceedings of the IEEE Conference on Computer Vision and Pattern Recognition, pages 1808-1817, 2018. PieAPP can be used to rank images that have been perturbed by translation, rotation, scaling and addition of texture to determine which images are likely imperceptibly different to a typical human observer. An algorithm for applying either 1-SSIM or Pie-APP to training images to generate a robust adversarial dataset is discussed in relation to FIG. 4, below. A robust adversarial dataset is a dataset that will effectively train a CNN 200 to process a wide variety of input images including images that are imperceptibly different than a dataset that does not include adversarial images.

Adversarial dataset generation 302 modifies images in one or more of location, scale, orientation, brightness, contrast, and texture in increasing steps, stopping when the computational effort functions determined by 1-SSIM or PieAPP indicate that the modifications would stop being imperceptible to a human observer. In this fashion, determining an adversarial dataset generation 302 becomes an efficient technique for enhancing training of a CNN 200 because adversarial dataset generation 302 generates images that have maximum differences from the original training dataset while remaining imperceptible to a typical human observer. Adversarial dataset generation 302 maximizes the likelihood that the adversarial images will enhance training of a CNN 200 to achieve fairness while minimizing the number of images and computing resources required to train the CNN 200.

Once an adversarial dataset of images that are imperceptibly different to a typical human observer are generated by the adversarial dataset generation 302, DRO 304 provides a framework for training CNN 200 using the generated images. DRO 304 enhances the efficiency with which a CNN 200 can be trained by selecting the training dataset to include a distribution of images in the training dataset that matches an unknown distribution of images in the real world. DRO 304 is a framework for training the CNN 200 to select images generated by adversarial dataset generation 302. By training CNN 200 with images selected from adversarial dataset generation 302, DRO 304 can avoid deploying a CNN 200 in the field only to find new types of images that the CNN 200 cannot process to identify objects, whereupon it may be necessary to acquire the new types of images and add them to a re-training dataset for re-training the CNN 200. An example process for implementing DRO 304 is described in relation to FIG. 5, below.

Figure 4:
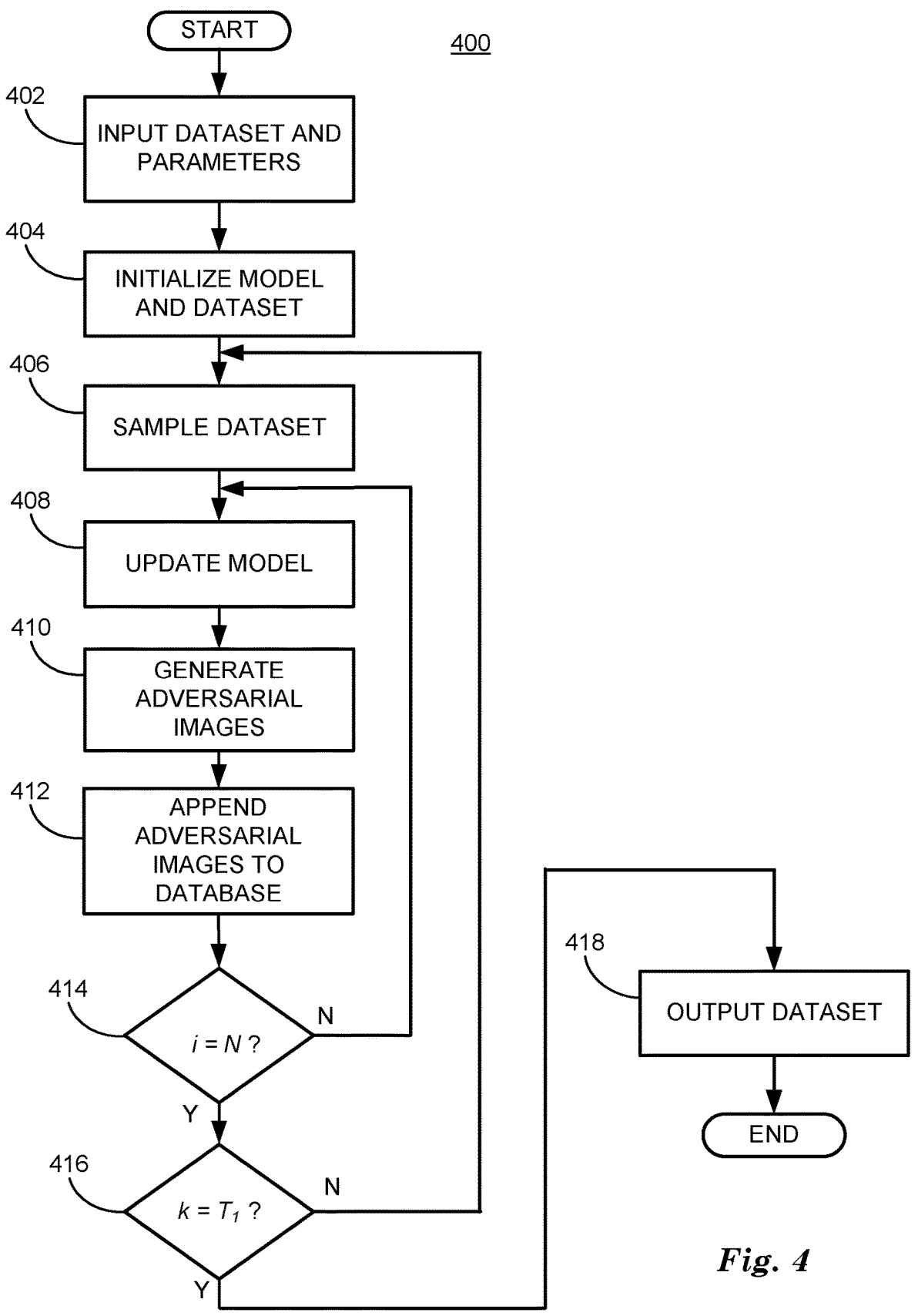
FIG. 4 is a flowchart diagram of an example process to generate an adversarial dataset.

FIG. 4 is a flowchart, described in relation to FIGS. 1-3 of a process 400 for generating a robust dataset $\mathcal{D}_{rob}$. Process 400 can be implemented by a processor of a server computer 120, taking as input a training dataset $\mathcal{D}$ and outputting a robust dataset $\mathcal{D}_{rob}$ that includes adversarial images $x_{adv}$. Process 400 includes multiple blocks that can be executed in the illustrated order. Process 400 could alternatively or additionally include fewer blocks or can include the blocks executed in different orders.

Process 400 begins at block 402 where a server computer 120 inputs an initial model $\theta_0$, which in this example is a CNN 200, a learning rate $\alpha$, which is user selected and in this example is 0.1, a dataset $\mathcal{D} = \{x_i, y_i\}_{i=1, \ldots, N}$, where $x_i$ are the images, $y_i$ are the ground truth labels, N is the number of images in the dataset, and the number of steps $T_1$, which is user selected and in this example is 100.

At block 404, server computer 120 initializes $\theta = \theta_0$, and dataset $\mathcal{D} = \{x_i, y_i, P_i\}_{i=1, \ldots, N}$ with model weights $P_i = 1$.

At block 406, process 400 begins a for-loop with k=1, 2, . . . , $T_1$ by sampling the dataset $\{x_i, y_i\}_{i=1, \ldots, N}$ proportional to the weights $P_i$ by replacement from dataset $\mathcal{D}$.

At block 408, process 400 beings an inner for-loop with i=1, 2, . . . , N by updating model $\theta$ according to the equation:

$$\theta \leftarrow \theta - \alpha P_i \nabla_\theta \ell\,(\theta; x_i, y_i), \qquad (3)$$

where $\nabla_\theta$ is a gradient operator for the loss function $\ell$ and $\ell\,(\theta; x_i, y_i)$ is a loss function for model $\theta$.

At block 410, server computer 120 uses model $\theta$, image $x_i$, and ground truth labels to generate adversarial images $\{x'_i, y_i\}$ using 1-SSIM or PieAPP as discussed above in relation to FIG. 3.

At block 412, server computer 120 appends adversarial images and weights $\{x'_i, y_i, P_i\}$ to dataset $\mathcal{D}$ where weights $P_i$ are determined by:

$$P_i = (k-1)N + i \qquad (4)$$

At block 414, server computer 120 increments index i and if i≤N, loops back to block 408, otherwise process 400 passes to block 416.

At block 416, server computer 120 increments index k, and if k≤$T_1$, loops back to block 406, otherwise process 400 passes to block 418.

At block 418, server computer 120 outputs robust dataset $\mathcal{D}_{rob} = \{x_i, y_i, P_i\}_{i=1, 2, \ldots, M}$ which includes M images, which equals the input N images plus the adversarial images add by process 400. Following block 418 process 400 ends.

Figure 5:
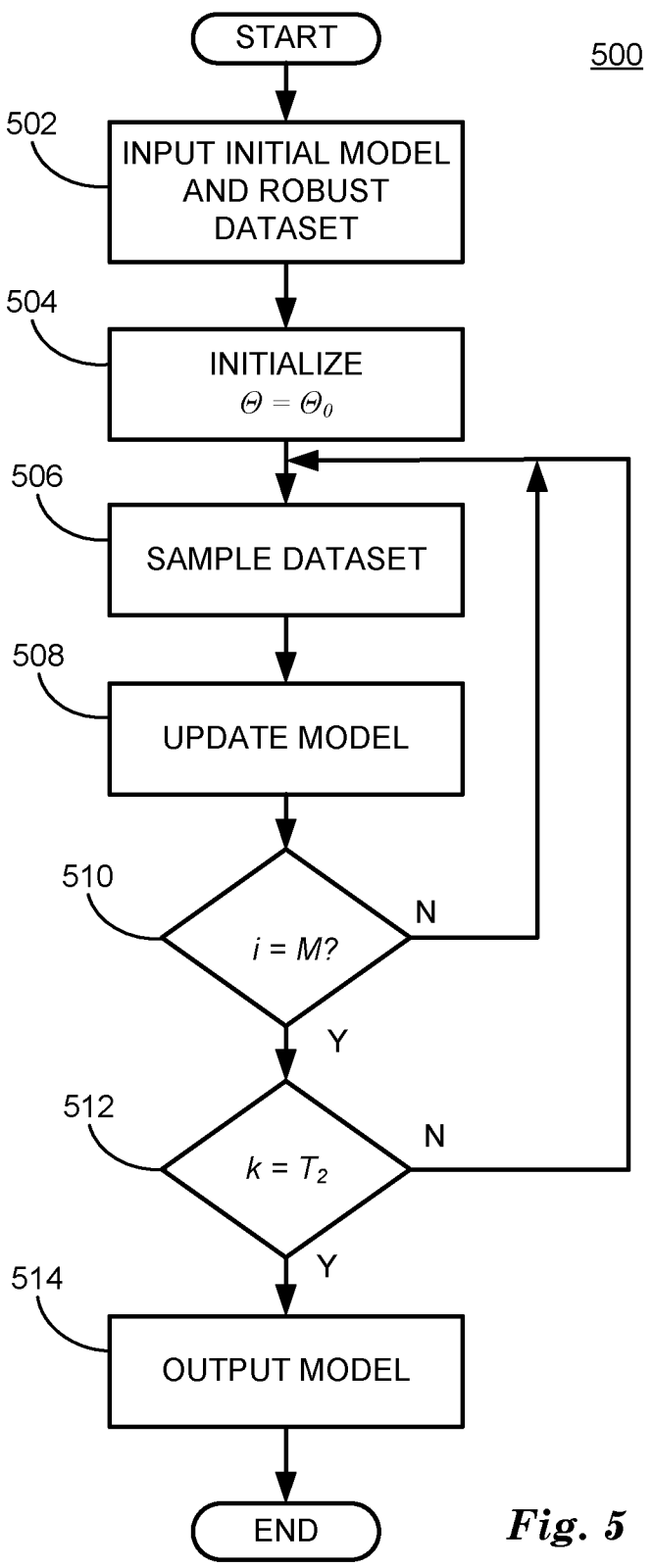
FIG. 5 is a flowchart diagram of an example process to determine distributed robust optimization.

FIG. 5 is a flowchart, described in relation to FIGS. 1-4 of a process 500 for training a model $\theta$, which can be a CNN 200, using DRO 304. Process 500 can be implemented by a processor of a server computer 120, taking as input an initial model $\theta_0$, a robust training dataset $\mathcal{D}_{rob}$ determined by process 400 in FIG. 4, above, and outputting a trained neural network $\theta$. Process 400 includes multiple blocks that can be executed in the illustrated order. Process 400 could alternatively or additionally include fewer blocks or can include the blocks executed in different orders.

Process 500 begins at block 502, where a server computer 120 inputs an initial model $\theta_0$, which in this example is a CNN 200, a learning rate $\alpha$, which is user selected and in this example is 0.1, and a robust dataset $\mathcal{D}_{rob} = \{x_i, y_i, P_i\}_{i=1, 2, \ldots, M}$ which includes adversarial images.

At block 504, server computer 120 initializes model $\theta = \theta_0$.

At block 506, server computer 120 begins two nested for loops with the outer for loop having $k=1, 2, \ldots, T_2$, where in this example $T_2 = 50$, and the inner loop having $i=1, 2, \ldots, M$, where M equals the number of images in the robust dataset $\mathcal{D}_{rob}$. Server computer 120 samples images and ground truth labels $\{x_i, y_i\}$ proportionally to the weights $P_i$ with replacement from the dataset $\mathcal{D}_{rob}$.

At block 508, server computer 120 updates the model $\theta$ according to the equation:

$$\theta \leftarrow \theta - \alpha P_i \nabla_\theta \ell\ (\theta; x_i, y_i) \tag{5}$$

Updating the model $\theta$ with the new weights trains the model $\theta$ with the adversarial images included in the robust dataset $\mathcal{D}_{rob}$. Training the model $\theta$ with adversarial images included in the robust dataset $\mathcal{D}_{rob}$ can achieve distributionally robust optimization.

At block 510, server computer 120 increments index i and if i≤M, loops back to block 506, otherwise process 500 passes to block 512.

At block 512, server computer 120 increments index k and if k≤$T_2$, loops back to block 506, otherwise process 500 passes to block 514.

At block 514, server computer 120 outputs the model $\theta$, where model $\theta$ has been trained with distributional robust optimization which enhances the fairness of model $\theta$. Training model $\theta$ generating an adversarial database as discussed in relation to FIG. 4 and DRO training as discussed in relation to FIG. 5 can achieve fairness in model $\theta$ training in a computationally efficient fashion, generating a diverse dataset with the low computational effort value. Following block 514 process 500 ends.

Figure 6:
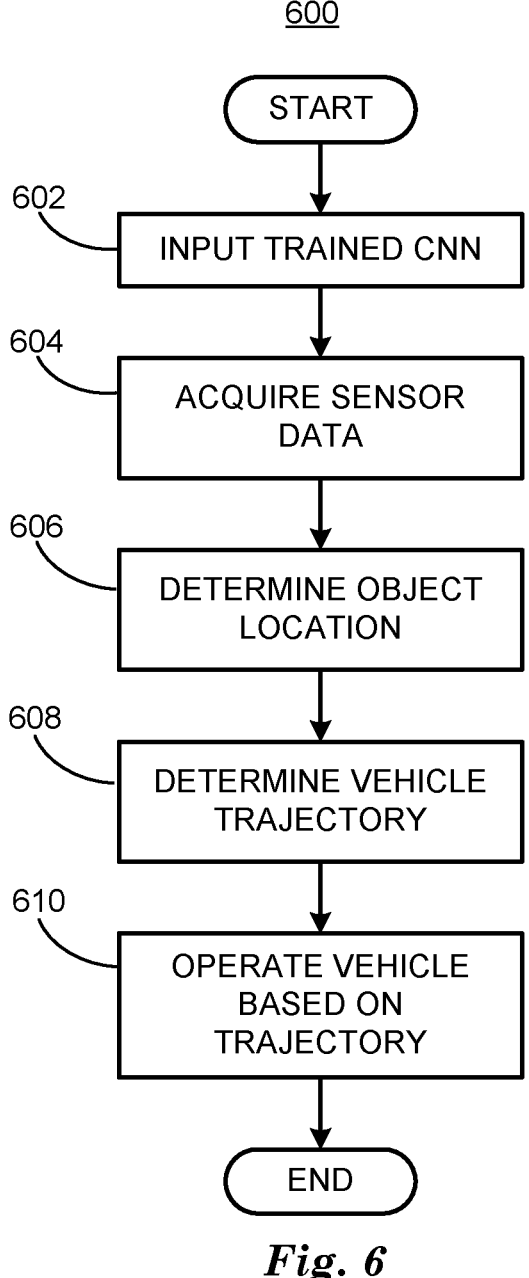
FIG. 6 is a flowchart diagram of an example process to operate a vehicle based on an object location.

FIG. 6 is a flowchart, described in relation to FIGS. 1-5 of a process 600 for operating a vehicle using a fairly trained CNN 200, trained by techniques discussed above in relation to FIGS. 2-5. Process 600 can be implemented by a processor of a computing device 115, taking as input images acquired by sensors 116, processing the images with a fairly trained CNN 200, and operating a vehicle 110 based on predictions output from the CNN 200. Process 600 includes multiple blocks that can be executed in the illustrated order. Process 600 could alternatively or additionally include fewer blocks or can include the blocks executed in different orders.

Process 600 begins at block 602, where a server computer 120 downloads a fairly trained CNN 200, trained according to techniques described in relation to FIGS. 2-5, above, to a computing device 115 included in a vehicle 110.

At block 604, computing device 115 inputs image data acquired by a sensor 116 included in a vehicle 110. The image data includes data regarding objects in an environment around the vehicle 110.

At block 606, computing device 115 inputs the image to the CNN 200 to determine a prediction regarding an object in the environment around the vehicle 110. For example, the prediction can include data regarding a label and a location of an object with respect to the vehicle 110, where the object can be another vehicle.

At block 608, computing device 115 can determine a vehicle trajectory based on the prediction regarding the object. A vehicle trajectory can be specified in a suitable manner, typically as a line connecting points plotted according to a polynomial function that describes vehicle 110 locations and speeds. The vehicle trajectory can be processed by computing device 115 to determine lateral and longitudinal accelerations to be applied to the vehicle 110 to cause the vehicle to travel on the path described by the vehicle trajectory. In this example the vehicle trajectory can be determined to help the vehicle 110 avoid contact with the other vehicle.

At block 610, computing device 115 can transmit instructions to vehicle controllers 112, 113, 114 to cause vehicle powertrain, vehicle steering, and vehicle brakes to operate vehicle 110 to travel along the vehicle trajectory determined at block 608 and help to avoid contact with another vehicle as determined by CNN 200. Following block 610 process 600 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
   a computer that includes a processor and a memory, the memory including instructions executable by the processor to:
   input an image acquired by a sensor to a neural network to output a prediction regarding an object included in the image; and
   wherein the neural network is trained based on (a) a distributed robust optimization that minimizes an expectation applied to probability distributions of loss functions to adversarial training images that yield a solution with a selected uncertainty level and (b) generating additional input images based on the adversarial images; wherein the additional input images are generated based on a structural similarity index measure.

2. The system of claim 1, wherein outputting the prediction regarding the image includes outputting an object identity and an object location.

3. The system of claim 1, wherein the neural network outputs a confidence value that indicates a probability that the prediction regarding the image is correct.

4. The system of claim 1, wherein the loss function is determined based on comparing output from the neural network with ground truth data based on the input image.

5. The system of claim 1, wherein the neural network includes convolutional layers and fully connected layers.

6. The system of claim 1, wherein the input images are respectively input to the neural network a plurality of times and the loss functions are backpropagated through layers of the neural network to select weights that minimize the loss functions.

7. The system of claim 1, wherein generating the additional input images based on the adversarial images includes determining imperceptible differences based on the structural similarity index measure.

8. The system of claim 7, wherein the structural similarity index measure generates images that are not perceptibly different to a human observer but can cause the neural network to fail.

9. The system of claim 1, wherein generating the additional input images based on the adversarial images includes determining imperceptible differences based on processing the input image with a PieAPP neural network.

10. The system of claim 9, wherein the PieAPP neural network generates images that are not perceptibly different to a human observer but can cause the neural network to fail.

11. A method, comprising:
   inputting an image acquired by a sensor to a neural network to output a prediction regarding an object included in the image; and
   wherein the neural network is trained based on (a) a distributed robust optimization that minimizes an expectation applied to probability distributions of loss functions to adversarial training images that yield a solution with a selected uncertainty level and (b) generating additional input images based on the adversarial images; wherein the additional input images are generated based on a structural similarity index measure.

12. The method of claim 11, wherein outputting the prediction regarding the image includes outputting an object identity and an object location.

13. The method of claim 11, wherein the neural network outputs a confidence value that indicates a probability that the prediction regarding the image is correct.

14. The method of claim 11, wherein the loss function is determined based on comparing output from the neural network with ground truth data based on the input image.

15. The method of claim 11, wherein the neural network includes convolutional layers and fully connected layers.

16. The method of claim 11, wherein the input images are respectively input to the neural network a plurality of times and the loss functions are backpropagated through layers of the neural network to select weights that minimize the loss functions.

17. The method of claim 11, wherein generating the additional input images based on the adversarial images includes determining imperceptible differences based on the structural similarity index measure.

18. The method of claim 17, wherein the structural similarity index measure generates images that are not perceptibly different to a human observer but can cause the neural network to fail.

19. The method of claim 11, wherein generating the additional input images based on the adversarial images includes determining imperceptible differences based on processing the input image with a PieAPP neural network.

20. The method of claim 19, wherein the PieAPP neural network generates images that are not perceptibly different to a human observer but can cause the neural network to fail.

* * * * *